United States Patent [19]

Davis

[11] Patent Number: 4,680,333
[45] Date of Patent: Jul. 14, 1987

[54] REMOVABLE HOT MELT PRESSURE SENSITIVE ADHESIVE

[75] Inventor: Irwin J. Davis, Bridgewater, N.J.

[73] Assignee: National Starch and Chemical Corporation, Bridgewater, N.J.

[21] Appl. No.: 852,005

[22] Filed: Apr. 14, 1986

[51] Int. Cl.$^4$ ............................................... C08K 5/09
[52] U.S. Cl. .................................... 524/394; 524/490; 525/333.1
[58] Field of Search ..................... 524/395, 490, 394; 525/333.1

[56] References Cited

U.S. PATENT DOCUMENTS

| | | | |
|---|---|---|---|
| 3,817,887 | 6/1974 | Mestetsky | 524/395 |
| 3,932,328 | 1/1976 | Korpman | 260/27 BB |
| 4,046,838 | 9/1977 | Feeney | 525/97 |
| 4,102,834 | 7/1978 | Morimoto et al. | 526/290 |
| 4,111,874 | 9/1978 | Meadus et al. | 524/395 |
| 4,130,603 | 12/1978 | Tanaka et al. | 524/904 |
| 4,136,071 | 1/1979 | Korpman | 260/27 BB |
| 4,157,319 | 6/1979 | Feeney et al. | 526/340 |
| 4,351,913 | 9/1982 | Patel | 521/54 |
| 4,399,249 | 8/1983 | Bildusas | 524/482 |
| 4,447,573 | 5/1984 | Harlbeck et al. | 524/451 |
| 4,500,021 | 2/1985 | Bildusas | 428/194 |
| 4,508,771 | 4/1985 | Peoples, Jr. et al. | 428/96 |
| 4,540,415 | 9/1985 | Korpman | 604/390 |
| 4,549,920 | 10/1985 | Cogswell et al. | 427/359 |
| 4,556,151 | 12/1985 | Taira et al. | 525/58 |
| 4,619,851 | 10/1986 | Sasaki et al. | 428/40 |

Primary Examiner—Joseph L. Schofer
Assistant Examiner—N. Sarofin
Attorney, Agent, or Firm—Ellen T. Dec; Edwin M. Szala

[57] ABSTRACT

Hot melt adhesive compositions prepared from styrene-isoprene-styrene block copolymers, a low softening point highly aliphatic resin and a metallic salt of a fatty acid exhibit a superior balance of properties in that they adhere well to a variety of substrates yet can be readily and cleanly removed when desired.

13 Claims, No Drawings

REMOVABLE HOT MELT PRESSURE SENSITIVE ADHESIVE

BACKGROUND OF THE INVENTION

The present invention is directed to removeable hot melt pressure sensitive adhesive compositions prepared from styrene-isoprene-styrene block copolymers, low softening point aliphatic resins and metallic salts of fatty acids.

Hot melt adhesives are 100% solid materials which do not contain or require any solvents. They are solid materials at room temperature but, on application of heat, melt to a liquid or fluid state in which form they are applied to a substrate. On cooling, the adhesive regains its solid form and gains its cohesive strength. In this regard, hot melt adhesives differ from other types of adhesives which achieve the solid state through evaporation or removal of solvents or by polymerization.

Hot melt adhesives may be formulated to be relatively hard and free of tack or, in contrast, to be pressure sensitive, i.e., relatively soft and tacky at room temperature. At present, there is a growing acceptance of employing hot melt adhesives in affixing labels. Pressure sensitive hot melt adhesives for labeling are usually categorized as either removable or permanent. Permanent adhesives are so formulated that once removed from the release liner applied to a substrate such as glass, metal, or plastic, they tear on any attempt to remove them and are sometimes referred to as "tamper-proof". The removable type, once applied to a substrate must be able to be removed from the substrate after a residence time on the substrate and at various temperatures the substrate may be subjected to. It must cleanly release leaving no residue and without tear of the label stock as in a permanent adhesive application.

Solid hot melt adhesives for permanent adhesives have been widely used for many years, however, a pressure sensitive hot melt that gives good removability has not been available. Current removal adhesives are supplied for label stock from acrylic latices and solvented solution adhesives. Both of these materials have high molecular weight polymers that reduce flow on a surface to prevent build up of adhesion. In contrast, hot melt pressure sensitive adhesives are based on materials having lower molecular weight polymers and high amounts of very low molecular weight components that make reduced flow or wetting on a surface very difficult.

It is therefore an object of the present invention to provide a hot melt pressure sensitive adhesive suitable for use in applications where good removability and resistance to adhesion build-up on aging are important criteria.

SUMMARY OF THE INVENTION

We have now found that hot melt adhesive compositions prepared from styrene-isoprene-styrene block copolymers, a low softening point highly aliphatic resin and a metallic salt of a fatty acid exhibit a superior balance of properties in that they adhere well to a variety of substrates yet can be readily and cleanly removed when desired. Thus, the present invention is directed to a removable hot melt pressure sensitive adhesive comprising: 25-50% by weight of a styrene-isoprene-styrene block copolymer; 20-50% by weight of a low softening point ($<30°$ C.) aliphatic resin and 0.25-3% by weight of a metallic salt of a $C_{14}$ to $C_{19}$ fatty acid.

In addition, the hot melt adhesive compositions of the invention may also contain up to about 30% by weight of a substantially aliphatic resin having a softening point of about 80° to 150° C. and/or up to about 25% by weight of a mineral oil or petrolatum. Antioxidants, as are generally used in hot melt adhesive compositions are also employed in small, effective amounts in the adhesives described herein.

The resulting hot melt adhesive compositions are characterized by excellent tack and adhesion when such properties are required yet with no adhesion build up on aging so that the bonded substrates may be readily and clearly separated when desired.

DETAILED DESCRIPTION OF THE PREFERRED EMBODIMENTS

The copolymers used herein are generally recognized and commercially available block copolymers, catagorized as A-B-A block polymers, where the A block comprises styrene or homologues thereof, e.g., alkphamethyl styrene, and the B block is isoprene. They are most commonly linear in nature although some radial block copolymers are available. The copolymers generally have a styrene or styrene homologue content within the range of about 10 to 35% by weight with the remainder of the copolymer comprising the isoprene component. These copolymers may be prepared using methods taught, for example, in U.S. Pat. Nos. 3,239,478; 3,427,269; 3,700,633; 3,753,936; and 3,932,327. Alternatively, they may be obtained from Shell Chemical Co. under the trademarks Kraton D1107, D1117, D1112, D1111; from Eni Chem Elastomeri (Italy), as Europrene Sol T190 and Europrene Sol T-192; from Fina Ltd. (Netherlands), as Finaprene 414; and from Dow as XU 16500 (an alpha methyl styrene-isoprene-alpha methyl styrene block). Commercially available copolymers in this class have styrene content of approximately 14 to 25% by weight. For use herein, these copolymers are generally present in the hot melt adhesive in an amount of 25 to 50% by weight, preferably 30 to 40%.

The low softening point essentially aliphatic resin which is in the adhesive of the present invention are those essentially aliphatic resins which have a softening point less then about 30° C. as determined by ASTM E-28 Ring and Ball Method. Since most hydrocarbon resins of this category contain a mixture of aromatic and aliphatic groups, we have found as a useful guideline in determining whether a resin is sufficiently aliphatic to be used herein to employ a modified version of the ASTM Aniline Point Test D611-82, the Mixed Methylcyclohexane Aniline Point Test (MMAP). This test measures the compatibility of a resin with methylcyclohexane and aniline and a value is reported as the temperature at which a specified mixture will give a cloudy appearance, having been cooled from a temperature at which the liquid mixture was clear. For use herein, we have found that the resins should have a MMAP value higher than about 40° C., preferably higher than 50° C.

Suitable commercially available low softening point aliphatic resins for use herein include Regalrez 1018 (MMAP=63° C.) available from Hercules; Exxon ECR140A (MMAP=42° C.) and Exxon ECR 327 (MMAP=77° C.) from Exxon; Wingtack 10 (MMAP=78° C.) from Goodyear; and Zonarez Alpha 25 (MMAP=61° C.) from Arizona Chemical. These resins are used in the removable hot melt adhesive compositions in amounts of 20 to 50% by weight, preferably 20 to 30% by weight.

The metallic salts of fatty acids utilized herein are the metallic salts of fatty acids with $C_{14}$ to $C_{19}$ chains such as the metallic stearates and oleates with zinc or calcium stearates being preferred due to their commercial availability. These salts are used in amounts of 0.25 to 3% by weight, preferably 0.5 to 1.5% by weight.

The hot melt adhesive compositions also generally contain 0.2 to 2% by weight, preferably about 1.5%, of an antioxidant. Among the applicable stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group hereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: 1,3,5-trimethyl 2,4,6-tris(3,5-di-tert-butyl-4-hydroxybenzyl)benzene; pentaerythrityl tetrakis-3(3,5-di-tert-butyl-4-hydroxyphenyl)-propionate; n-octadecyl-3-(3,5-di-tert-butyl-4-hydroxyphenyl)propionate; n-octadecyl-3(3,5-di-tert-butyl-4-hydroxyphenyl)-propionate; 4,4'-methylenebis(2,6-tert-butylphenol); 4,4'-thiobis(6-tert-butyl-o-cresol); 2,6-di-tertbutylphenol; 6-(4-hydroxyphenoxy)2,4-bis(n-octyl-thiol)-1,3,5-triazine; di-n-octadecyl 3,5-di-tert-butyl-4-hydroxy-benzylphosphonate; 2-(n-octylthio)ethyl 3,5-di-tert-butyl-4-hydroxy-benzoate; sorbitol hexa[3-(3,5-di-tert-butyl-4-hydroxyphenyl)-propionate]; zinc diethyl dithiocarbamate and zinc dibutyl dithiocarbamate.

The performance of these antioxidants may be further enhanced by utilizing, in conjunction therewith known synergists such, for example, as thiodipropionate esters and phosphites, particularly useful is distearylthiodipropionate.

In addition to the required components as recited above, the removeable hot melt adhesives of the invention may also contain up to about 30% by weight, preferably 20-25% by weight, of an essentially aliphatic resin having a softening point within the range of about 80° to 150° C. As discussed previously, the Mixed Methylcyclohexane Aniline Point Test is used to categorize the aliphatic nature of the hydrocarbon resin. Suitable resins include $C_5$ synthetic terpene resins such as Wingtack 95 from Goodyear (MMAP is approximately 93° C.); terpene resins derived from alpha or beta-pinene or dipentene resins such as Nirez 1100 or 1115 from Reichhold; resins derived from dipentene or d-limonene such as Zonarez 7100 from Arizona Chemical and resins derived from isoprene such as Escorez 1310 (MMAP=93° C.) from Exxon.

The adhesives may further contain up to about 25% by weight, preferably 10-20% by weight, of a plasticizing or extending oil in order to provide wetting action and/or viscosity control. The above broadly includes the usual plasticizing oils such as paraffinic and naphthenic oils. The petroleum derived oils which may be employed are relatively high boiling materials containing only a minor proportion of aromatic hydrocarbons (preferably less than 30% and, more particularly, less than 15% by weight of the oil.) Alternatively, the oil may be totally non-aromatic.

Other additives such as plasticizers, pigments, dyestuffs conventionally added to hot melt adhesives for various end used contemplated may also be incompated in minor amounts into the formulations of the present invention.

The adhesive compositions are prepared by blending the components in the melt at a temperature of about 130°-200° C. until a homogeneous blend is obtained, approximately 2 hours. Various methods of blending are known to the art and any method that produces a homogeneous blend is satisfactory. An exemplary procedure involves placing the block copolymer, antioxidants and a portion of the oil preferably under an inert gas environment in a jacketed mixing kettle, preferably in a jacketed heavy duty mixer of the Baker-Perkins or Day type, which is equipped with rotors and thereupon raising the temperature to a range of from about 120° to 180° C. When the mixture has been masticated to a uniform consistency, the tackifying resin and the remainder of the oil are slowly added over a period in order to avoid the formation of lumps. Mixing and heating are continued until a smooth, homogeneous mass is obtained whereupon the remainder of the tackifying resin and the oil are thoroughly and uniformly admixed therewith. The resultant hot melt adhesives are generally produced in bulk form and packaged in release coated containers or they may be coated directly onto the tape or label stock.

The adhesive is useful on any conventional label or other face stock including not only paper, but also including those substrates made from printed plastic foils or films or metal or metallized foils. The paper face stock is generally a lithographic or chrome coated paper which may or may not be preprinted on one or both sides. The release liner is generally bleached kraft stock which has been coated with silicone release agent although other release liners known in the art may also be employed.

The composite lamination is typically manufactured by coating the hot melt in a molten state at a temperature greater than about 130° C. from a slot or roll coated onto the release liner at approximately 10.0-14.0 lbs/ream (3000 sq. ft.). The coated release liner is then laminated to the face stock by a nip roll using pressure between a rubber roll and a steel roll. This technique effects a transfer of the adhesive mass to the face stock with a minimum of penetration.

The adhesives of this invention, while disclosed with regard to their use on labels, may also be used in other hot melt applications to join two or more substrates together if separation thereof is later desired.

This invention can be further illustrated by the following examples of preferred embodiments thereof, although it will be understood that these examples are included merely for purposes of illustration and are not intended to limit the scope of the invention unless otherwise specifically indicated.

EXAMPLES

In the following examples, all adhesive formulations were prepared in a Sigma mixer heated to 170° C. by blending the components until homogeneous.

The adhesives were then transfer coated, applied to a 40 lb. kraft siliconized release liner, then nipped to the backside of a 60 lb. Kromekote paper label stock at approximately 11.0/lbs/ream. All samples were not tested immediately but aged for at least 24 hrs. to permit the adhesive mass to key into the untreated side of the 60 lb. Kromokote. The adhesives were tested using PSTC #1 to standard PSTC stainless steel panels. Residence time on the panels were recorded as indicated, then allowed 1 hr. at room temperature (22° C.) prior to a peel test on an Instron run at 12 inches/minute.

CRITERIA FOR REMOVABILITY

The initial peel from the stainless steel panel is generally below 1.0 lb. or 16 oz. per linear inch. The criteria for removability is aging the panels with 1"×6" strips of label stock on the panel at room temperature and elevated temperature (48° C.), cooling 1 hour at room temperature, then again running a peel adhesion of the label stock off the panel it has been aged on. The resultant peel should be below 2.5 lbs. or 40 oz. Values above this can result in paper tear which would indicate the product is not removable. It is desired that the adhesive value after aging on the panel be no different from the initial value or show only a very small increase (value below 2.0 lbs. 32 oz.).

EXAMPLE I

The following formulations were made to demonstrate effect of the low softening resin on removability. In these formulations, the sample designated A has all low softening resin with subsequent increases in higher melting resin until it is totally replaced with high softening resin in Sample E.

|  | A | B | C | D | E |
| --- | --- | --- | --- | --- | --- |
| Kraton D1112 | 35 | 35 | 35 | 35 | 35 |
| Regalrez 1018 (MMAP = 63° C.) | 50.0 | 37.5 | 25.0 | 12.5 | — |
| Wingtack 95 (MMAP approx. 93°) | — | 12.5 | 25.0 | 37.5 | 50.0 |
| White mineral oil | 15 | 15 | 15 | 15 | 15 |
| Coad 50* | 1 | 1 | 1 | 1 | 1 |
| Irganox 1010 | 0.5 | 0.5 | 0.5 | 0.5 | 0.5 |
| Data |  |  |  |  |  |
| Initial peel | 0.6 lbs | 0.7 lbs | 0.6 lbs | 7.0 lbs | tear |
| 24 hrs peel @ RT | 1.0 lbs | 1.1 lbs | 0.8 lbs | tear | tear |
| 24 hrs peel @ 48° C. | 1.1 lbs | 1.2 lbs | 0.8 lbs | tear | tear |
| 1 week peel RT | 1.0 lbs | 1.4 lbs | 1.1 lbs | tear | tear |
| 1 week peel @ 48° C. | 1.2 lbs | 1.4 lbs | 1.7 lbs | tear | tear |

*A mixture of zinc and calcium stearate from Mathe Company, Lodi, NJ

The results show that adhesive formulations D and E which do not contain adequate levels of the low softening point aliphatic resin exhibit an unacceptably high initial peel and, after aging, are no longer removeable.

EXAMPLE 2

The following example demonstrates the need for the metallic salts in the formulations of the invention.

|  | F | G | H |
| --- | --- | --- | --- |
| Kraton D1112 | 35.0 | 35.0 | 35.0 |
| Regalrez 1018 | 22.5 | 22.5 | 22.5 |
| Wingtack 95 | 22.5 | 22.5 | 22.5 |
| Petrolatum | 7.5 | 7.5 | 7.5 |
| Coad 50 | — | 0.5 | 1.5 |
| Mineral oil | 12.0 | 12.0 | 12.0 |
| Ethox 330 (antioxidant) | .25 | .25 | .25 |
| Santavar A (antioxidant) | .25 | .25 | .25 |
| Data |  |  |  |
| Initial peel S/S | 1.3 lbs | 1.2 lbs | 0.6 lbs |
| 24 hours @ RT S/S | 1.5 | 1.3 | 0.8 |
| 24 hrs @ 48° C. S/S | 2.4 | 2.1 | 1.2 |
| 1 week @ RT | 1.8 | 1.3 | 0.7 |
| 1 week @ 48° C. | tear | 2.6 | 1.4 |

The results show that, on aging, sample F prepared without the metallic salt builds up adhesion and is no longer removeable.

EXAMPLE 3

The following example illustrates the use of different types of rubbery block copolymers in the formulations.

|  | J | K | L | M | N |
| --- | --- | --- | --- | --- | --- |
| Kraton D1112 (SIS) | 35 | — | — | — | — |
| Kraton D1117 (SIS) | — | 35 | — | — | — |
| Kraton D1107 (SIS) | — | — | 35 | — | — |
| Kraton G1657 (SEBS) | — | — | — | 35 | — |
| Kraton 1102 | — | — | — | — | 35 |
| Wingtack 95 | 22.5 | 22.5 | 22.5 | 22.5 | — |
| Wingtak 86 | — | — | — | — | 25 |
| Regalrez 1018 | 22.5 | 22.5 | 22.5 | 22.5 | 25 |
| White Mineral Oil | 12.0 | 12.0 | 12.0 | 12.0 | 15.0 |
| Petrolatum | 7.5 | 7.5 | 7.5 | 7.5 | — |
| Coad 50 | 1.0 | 1.0 | 1.0 | 1.0 | 1.5 |
| Ethox 330 | .25 | .25 | .25 | .25 | .50 |
| Santavar A | .25 | .25 | .25 | .25 | .50 |

Kraton D1112 14% Styrene/86% Isoprene low molecular weight
Kraton D1117 17% Styrene/83% Isoprene low molecular weight
Kraton D1107 14% Styrene/86% Isoprene medium molecular weight
Kraton G1657 14% Styrene/86% ethylene butylene
Kraton 1102 30% Styrene/70% butadiene

| Initial peel | 0.8 lbs | 1.2 lbs | 1.2 lbs | 1.2 | 0.6 ghost |
| --- | --- | --- | --- | --- | --- |
| 24 hrs @ RT | 1.1 | 1.7 | 1.9 | 1.3 | 0.6 ghost |
| 24 hrs @ 48° C. | 1.3 | 2.0 | 2.2 | tear | 1.1 ghost |
| 72 hrs @ RT | N/T | N/T | N/T | N/T | .75 ghost |
| 72 hrs @ 48° C. | N/T | N/T | N/T | N/T | 1.2 ghost/tear |
| 1 week @ RT | 1.4 | 2.1 | 2.1 | tear | N/T |
| 1 week @ 48° C. | 1.8 | 1.4 | 2.6 | tear | N/T |

N/T = Not tested

The above results demonstrate the specific utility of SIS type rubber. The Kraton G1657 showed excessive build up resulting in tear on aging. In addition to exhibiting some build up on aging, the Kraton 1102 left a substantial amount of residue which could mar or stain the surface when the labels were removed.

EXAMPLE 4

This experiment demonstrates the necessity for a substantially aliphatic hydrocarbon resin. The preferred resins tested were:

| Resin | Soft Point |
| --- | --- |
| Regalrez 1018 | 17° C. |
| Exxon ECR 140A | <30° C. |
| Wingtack 10 | 10° C. |

The above can all be described as aliphatic resins with softening points less than 30° C. For comparative purposes, Piccovar L30, an aromatic resin having a softening point less than 35° C. but an MMAP of 8° C. and Stabelite Ester #3, a rosin ester of ethylene glycol were also tested.

|  | O | P | Q | R |
|---|---|---|---|---|
| Formulations |  |  |  |  |
| Kraton D1112 | 35.0 | 35.0 | 35.0 | 35.0 |
| Wingtack 10 | 25.0 | — | — | — |
| Exxon EC 140A | — | 25.0 | — | — |
| Stabelite Ester #3 | — | — | 25.0 | — |
| Piccovar L30 | — | — | — | 25.0 |
| Wingtack 95 | 25.0 | 25.0 | 25.0 | 25.0 |
| Mineral Oil | 15.0 | 15.0 | 15.0 | 15.0 |
| Coad 50 | 1.0 | 1.0 | 1.0 | 1.0 |
| Antioxidant | 1.5 | 1.5 | 1.5 | 1.5 |
| Data |  |  |  |  |
| Initial peel | 0.8 lbs | 0.5 lbs | 3.6 lbs | 2.1 lbs |
| 24 hrs @ RT | 1.2 | 0.7 | tear | 2.6 |
| 24 hrs @ 48° C. | 1.5 | 0.8 | tear | 4.0 |
| 1 week @ RT | 1.5 | 0.8 | tear | tear |
| 1 week @ 48° C. | 1.7 | 1.7 | tear | tear |

The results demonstrate the necessity for the use of soft essentially aliphatic resins since the more aromatic resins exhibited a high degree of initial tack which increased on aging so they were no longer removeable.

EXAMPLE 5

This example demonstrates the necessity for utilizing the fatty acid in the form of its metallic salt.

|  | S | T | U | V |
|---|---|---|---|---|
| Kraton D1112 | 35.0 | 35.0 | 35.0 | 35.0 |
| Regalrez 1018 | 25.0 | 25.0 | 25.0 | 25.0 |
| Wingtack 95 | 25.0 | 25.0 | 25.0 | 25.0 |
| White Mineral Oil | 15.0 | 15.0 | 15.0 | 15.0 |
| Coad 20 ($Zn^{++}$ Stearate) | 1.5 | — | — | — |
| Coad 10 ($Ca^{++}$ Stearate) | 1.5 | — | — | — |
| Aluminum Stearate | — | — | 1.5 | — |
| Stearic Acid | — | — | — | 1.5 |
| Antioxidants | 1.5 | 1.5 | 1.5 | 1.5 |
| Data |  |  |  |  |
| Initial Peel | 1.0 | 1.3 | 1.0 | 1.1 ghost |
| 24 hrs @ RT | 1.2 | 1.7 | 1.3 | 1.1 ghost |
| 24 hrs @ 48° C. | 1.0 | 2.0 | 1.9 | 1.2 ghost |
| 1 week @ RT | 0.8 | 1.0 | 1.0 | 0.6 ghost |
| 1 week @ 48° C. | 1.1 | 1.4 | 1.1 | 0.7 ghost |

The results show that while the stearic acid is effective in preventing adhesive build up, it leaves a greasy deposit referred to as a "ghost" which could stain and mar a surface. The metallic stearates do not do this. We have also noted in some cases after long aging, there is an actual drop in adhesion with the metallic stearates, indicating a surface phenomenon or orientation of the metallic stearate at the adhesive/surface interface that prevents tack build up and does not exude to mar the surface, an important feature herein.

Now that the preferred embodiments of the present invention have been described in detail, various modifications of improvements thereon will become readily apparent to those skilled in the art. Accordingly, the spirit and scope of the present invention is to be limited only by the appended claims, and not by the foregoing disclosure.

I claim:
1. A removeable pressure sensitive hot melt adhesive composition consisting essentially of:
   (a) 25 to 50% by weight of an A-B-A block copolymer where the A component is styrene or a homologue thereof and the B component is isoprene;
   (b) 20 to 50% by weight of a substantially aliphatic hydrocarbon resin having a softening point less than about 30 C;
   (c) 0 to 30% by weight of a substantially aliphatic hydrocarbon resin having a softening point of about 80 to 150 C;
   (d) 0 to 25% by weight of mineral oil or petrolatum;
   (e) 0.25 to 3% by weight of a metallic salt of a $C_{14}$ to $C_{19}$ fatty acid; and
   (f) 0.2 to 2% of an antioxidant.
2. The adhesive composition of claim 1 wherein there is additionally present up to about 30% by weight of a substantially aliphatic hydrocarbon resin having a softening point of about 80° to 150° C.
3. The adhesive composition of claim 1 wherein there is additionally present up to about 25% by weight of mineral oil or petrolatum.
4. The adhesive composition of claim 1 wherein the A-B-A copolymer is a styrene-isoprene-styrene copolymer containing from 10 to 35% by weight styrene.
5. The adhesive composition of claim 4 wherein the A-B-A copolymer is a styrene-isoprene-styrene copolymer containing 14 to 25% by weight styrene.
6. The adhesive composition of claim 1 wherein the A-B-A copolymers is present in an amount of 30 to 40% by weight.
7. The adhesive composition of claim 1 wherein the metallic salt is a salt of stearic or oleic acid.
8. The adhesive composition of claim 1 wherein the metallic salt is calcium stearate or zinc stearate.
9. The adhesive composition of claim 1 wherein the metallic salt is present in an amount of 0.5 to 1.5% by weight.
10. The adhesive composition of claim 2 wherein the hydrocarbon resin is selected from the group consisting of $C_5$ synthetic terpene resins, terpene resins derived from alpha or beta-pinene, dipentene, d-limonene, and isoprene.
11. The adhesive composition of claim 2 wherein the hydrocarbon resin is present in an amount of 20 to 25% by weight.
12. The adhesive composition of claim 3 wherein the mineral oil is a paraffinic or naphthenic oil.
13. The adhesive composition of claim 3 wherein the oil or petrolatum is present in an amount of 10 to 20% by weight.

* * * * *

UNITED STATES PATENT AND TRADEMARK OFFICE
CERTIFICATE OF CORRECTION

PATENT NO. : 4,680,333
DATED : July 14, 1987
INVENTOR(S) : Irwin J. Davis

It is certified that error appears in the above-identified patent and that said Letters Patent are hereby corrected as shown below:

At column 7, line 35, "1.5" should be under Sample T and not Sample S.

Signed and Sealed this

Eighth Day of March, 1988

Attest:

DONALD J. QUIGG

Attesting Officer

Commissioner of Patents and Trademarks